Sept. 2, 1952     E. H. GRANBERRY     2,608,858
SPINDLE TESTING DYNAMOMETER
Filed Feb. 8, 1950     3 Sheets-Sheet 1
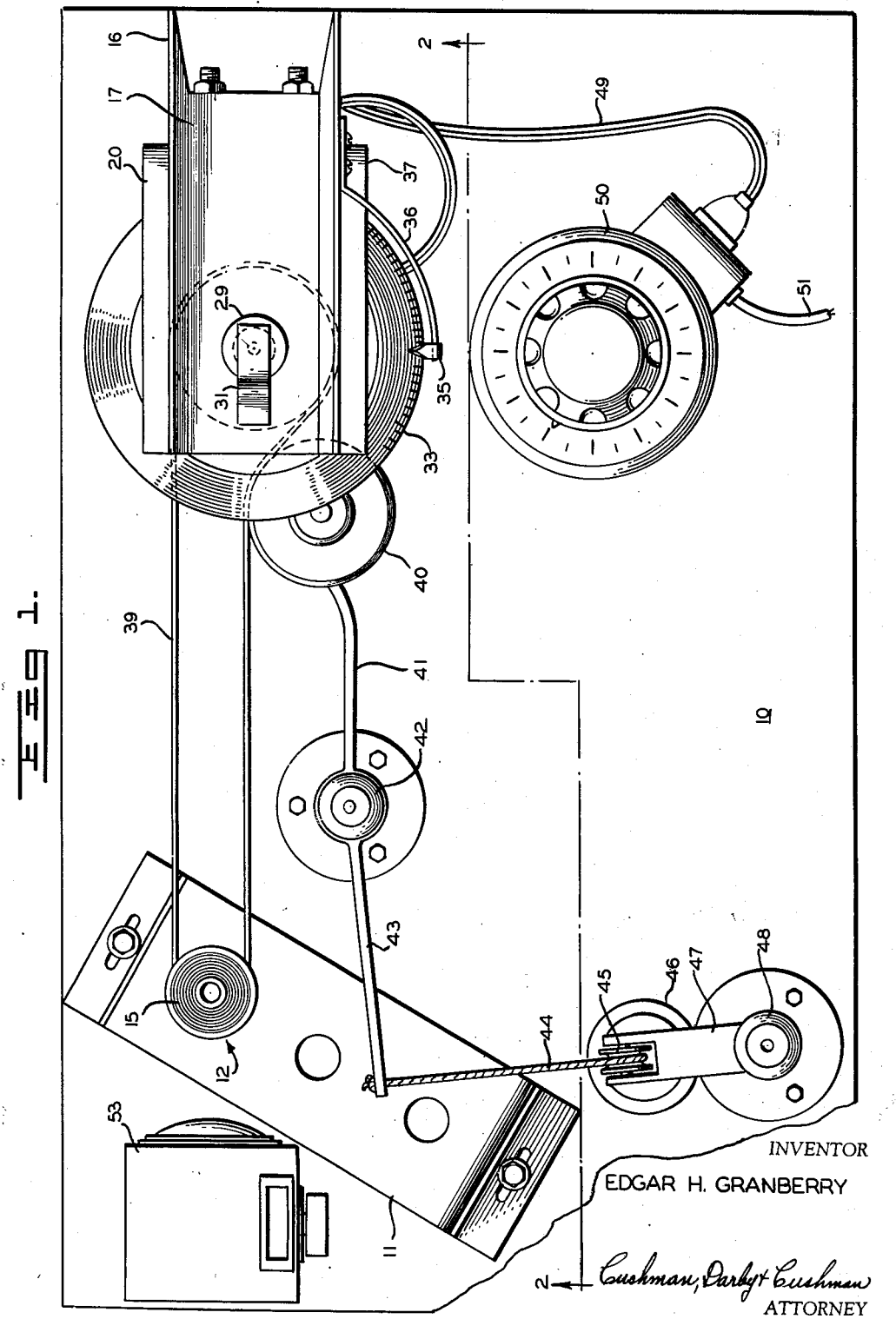
INVENTOR
EDGAR H. GRANBERRY
Cushman, Darby & Cushman
ATTORNEY

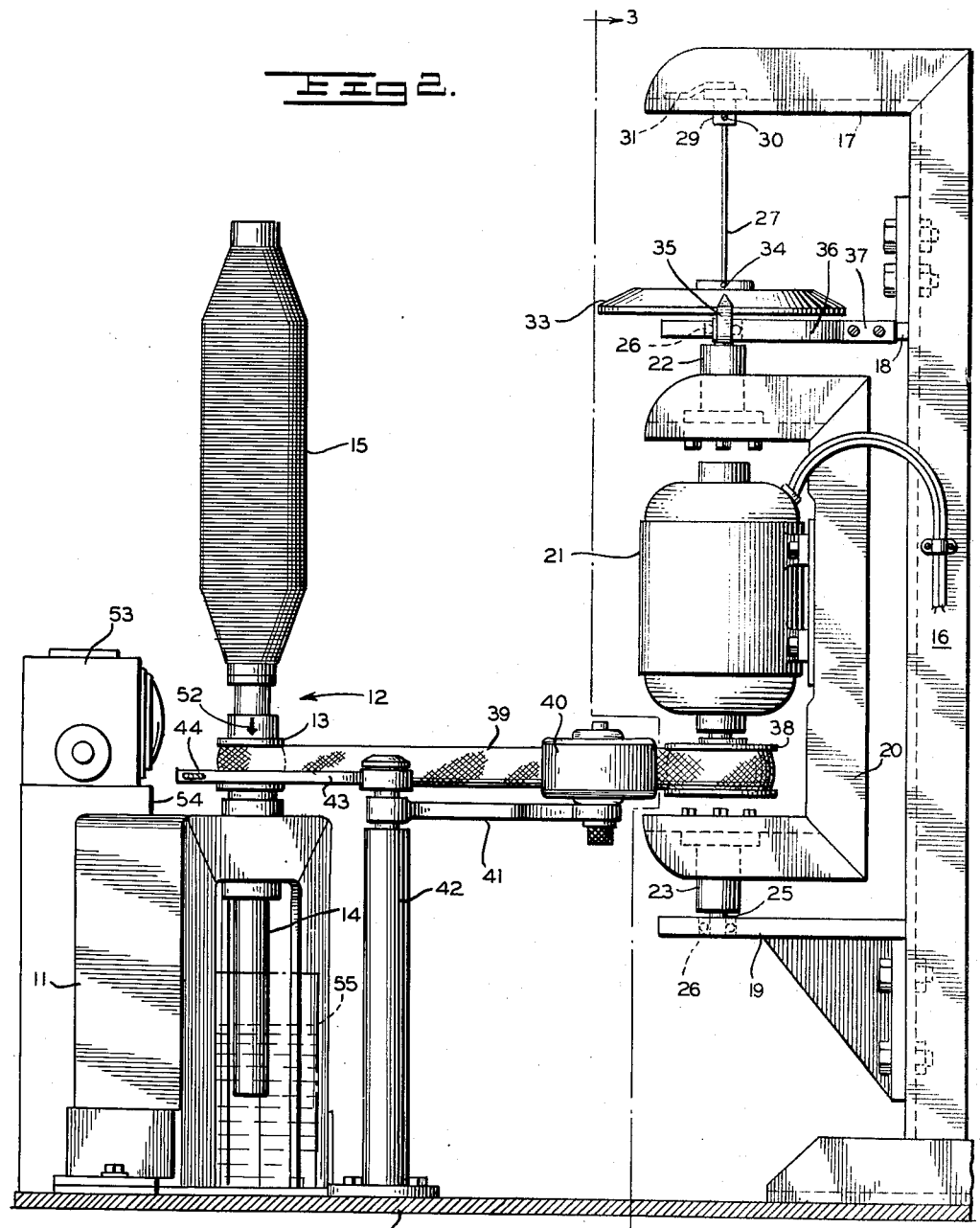

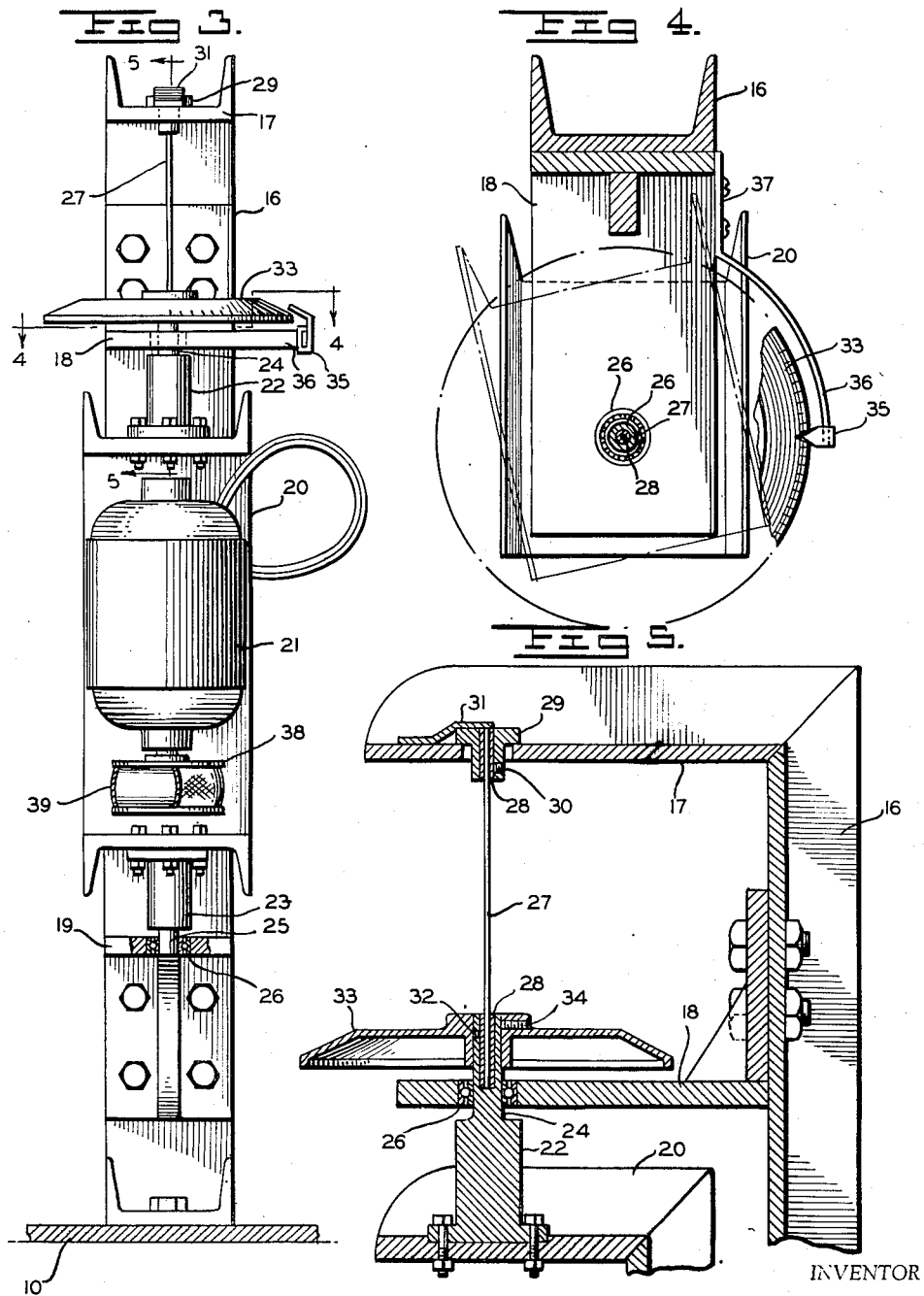

Patented Sept. 2, 1952

2,608,858

UNITED STATES PATENT OFFICE 2,608,858

SPINDLE TESTING DYNAMOMETER

Edgar H. Granberry, Shawmut, Ala., assignor to West Point Manufacturing Company, West Point, Ga., a corporation of Alabama Application February 8, 1950, Serial No. 143,055

10 Claims. (Cl. 73—136)

This invention relates to the measurement of power consumption by rotatable members, and particularly to means for measuring the power input into cotton spinning spindles, whereby spindles of various types may be compared from the viewpoint of power consumption, and the entire power problem as related thereto may be surveyed to isolate and evaluate the various factors involved therein.

The problem of power consumption by cotton spinning spindles is of considerable economic importance. Approximately fifty percent of the total power used by a mill goes into the spinning room, wherein most of this power is lost in friction, a small proportion only going into the useful work of spinning and winding the yarn. Extensive power consumption investigations under actual running conditions in the mill are both time consuming and expensive, and development of a simple, versatile and accurate mechanism and method for supplementing such data by laboratory test has long been desired.

It is an object of the present invention, accordingly, to provide a novel mechanism for measurement of power input into rotatable members.

It is a particular object of the invention to provide means for determining the power consumption of cotton spinning spindles under a variety of readily controlled conditions.

A further object of the invention is to provide means adapted to measure power input into rotatable members with great accuracy, the system being inherently flexible and adaptable in utilization to permit isolation and investigation of individual factors contributing to total power consumption.

Another object is to provide simple and inexpensive mechanism for measuring power consumption, readily portable and requiring little or no maintenance.

Still another object is to provide a dynamometer substantially free of friction error.

Further objects will be in part obvious and in part pointed out hereinafter.

The invention and the novel features thereof may best be made clear from the following description and the accompanying drawings, in which:

Figure 1 is a general plan view of an exemplary embodiment of the invention, arranged to measure power input into a conventional cotton spinning spindle;

Figure 2 is an elevational view taken along the line 2—2 of Figure 1;

Figure 3 is a front elevational view of the dynamometer components of the invention, taken along the line 3—3 of Figure 2;

Figure 4 is a sectional plan view taken along the line 4—4 of Figure 3, showing details of the mechanism, and Figure 5 is a sectional elevational view taken on the line 5—5 of Figure 3, showing further details.

Referring to the drawings, in Figures 1 and 2 is shown a table member 10, preferably of heavy cast iron construction, and rigidly mounted thereon the frame 11, adapted to support in the usual manner a spindle under test, indicated generally as 12. As shown, the spindle comprises the conventional whorl 13 and bolster case 14, and carries a bobbin 15, in this case a full bobbin.

Similarly mounted on table 10 adjacent frame 11 is a vertical standard 16, from which the arms 17, 18 and 19 extend laterally. If desired, the frame 11, standard 16 and other support elements mounted on the table may be isolated therefrom by rubber pads (not shown) inserted between them and the table, in order to reduce vibration to a minimum. Between standard arms 18 and 19, a cradle 20 is vertically disposed, upon which the motor 21 is rigidly mounted. Upper and lower trunnions 22 and 23, coaxial with motor 21, extend vertically from the cradle, and terminate at their outer ends in the reduced portions 24 and 25, respectively, which extend through standard arms 18 and 19 and are enclosed by the anti-friction bearings 26 mounted therein. As will presently be apparent, standard arms 18 and 19 and their anti-friction bearings 26 support none of the weight of the motor and cradle, but function merely to maintain their axial alignment and prevent lateral deviation thereof.

The motor-cradle assembly is suspended by means of a torsion element 27 coaxial therewith, rigidly fixed at its upper end to standard arm 17, and supporting at its lower end the entire weight of the assembly. Element 27 may desirably be a length of piano wire, of, for example, .035 inch diameter. To determine accurately the free length of the wire torsion element and provide end grips therefor, each end thereof may be silver soldered into a brass tube 28, the effective length of the wire being equal to the distance between the inner ends of tubes 28. At the upper end of the torsion element, a flanged lug 29 is engaged to the tube 28 by means of a set screw 30. The lug flange rests on the upper surface of arm 17, as shown, and is securely retained in place by suitable means, such as clip 31, welded or pivotally connected to the arm. The lower tube 28 is received in the reduced portion 24 of trunnion 22, and retained therein as by set screw 32, as clearly shown in Figure 5.

To conveniently indicate torsional deflection of wire 27, a dial 33, preferably graduated in degrees, is provided and suitably fastened to the periphery of reduced portion 24 by a set screw 34. As best shown in Figure 4, a pointer 35 is disposed in adjacency to the graduated edge of dial 33, slidably retained on the arcuate portion 36 of clip 37, which is rigidly fixed to standard 16. The slidable mounting of the pointer permits ready adjustment thereof to zero the mechanism.

A drive pulley 38 is mounted on the lower end of motor 21, at the vertical level of spindle whorl 13, and is engaged thereto in driving relationship by an endless fabric belt 39, preferably of very light weight. In order to suitably tension the belt 39 and apply static load to the spindle, an idler pulley 40 is rotatably mounted at the outer end of a pivot arm 41, which is pivotally supported by post 42 mounted on the table, and engaged to the oppositely extending pivot arm 43. To simplify calculations as to the static belt load on the spindle, the idler pulley is disposed to effect parallelism between the belt portions on either side of the spindle whorl (as best shown in Figure 1), and force is applied thereto by means of a dead weight. Specifically, in the example a flexible cord 44 is fixed to the outer end of pivot arm 43, and conducted therefrom in a direction substantially normal thereto over a stationary pulley 45 and thence downwardly to the dead weight 46, which depends from the lower end of the cord. As shown, pulley 45 may be rotatably supported by an arm 47 extending outwardly from a suitable post 48.

Motor 21 is preferably a series-wound universal motor, and power is conducted thereto through conductors 49 from a variable voltage transformer 50, by means of which the speed of motor 21 may be finely controlled. Obviously, other means to obtain variable speed may be employed, such as a Thymotrol unit. Conductors 49 desirably are widely looped, so as to offer substantially no resistance to free rotation of the motor-cradle assembly. Power is conducted to the transformer 50 from any suitable source (not shown) by conductors 51. To determine accurately the speed of the spindle when driven, a suitable mark 52 may be painted or otherwise placed thereon (Figure 2), and a stroboscope 53 of variable frequency suitably mounted on a platform 54 may be employed therewith. In operation, it will be readily recognized, the speed of the driving motor may be controlled by means of the transformer, and the speed of the driven spindle may be checked by viewing the mark 52 in the light of stroboscope 53, in the well known manner.

As illustrated in dotted lines in Figure 2, a constant temperature bath 55 may be disposed below frame 11 to enclose or partially enclose the bolster case of the spindle under test, in order to eliminate variations in oil temperature therein.

The invention is adapted to be utilized as follows. The pointer 35 being previously adjusted to coincide with zero position on the dial 33, a spindle 12 to be tested may be set up in frame 11 and connected to motor pulley 38 by belt 39. A dead weight 46 is selected and attached to flexible cord 44 to apply the desired force to idler pulley 40, and thereby give the desired tension to the belt and the desired static load to the spindle for the test. The dead weight required to produce a desired tension in the belt may be readily determined by force vectors. By the arrangement previously described, wherein the belt portions on both sides of the spindle whorl are disposed in parallelism, it will be evident that the static belt load on the spindle whorl is twice the tension in the belt.

If desired, a constant temperature bath 55 may be positioned about the spindle bolster 14 to maintain the temperature of the bolster oil constant throughout the test. The frequency of stroboscope 53 having been adjusted to correspond to the desired spindle R. P. M., the motor 21 may be started and adjusted to proper speed by means of transformer 50, to give the desired spindle speed, which may be checked with the aid of mark 52 in the light of the stroboscope in the well known manner. The reaction torque on the driving motor will, of course, tend to rotate the motor, and the motor-cradle assembly will be rotated thereby, as indicated by dotted lines in Figure 4, torsionally deflecting the wire 27 by which they are suspended. After conditions stabilize, the deflection of the wire torsion element may be noted from the dial, which rotates with the lower end thereof, while the pointer remains stationary with standard 16. This deflection of the torsion element may be readily interpreted into the power output of the motor, which is equal to the power input into the spindle, plus belt and pulley losses.

The dynamometer may be initially calibrated by first adjusting to zero as described above, and then wrapping a light cord around lower trunnion 23 of the cradle. The cord may then be carried over a pulley and known weights applied to it. As the weights are applied, the resultant torsional deflections are recorded, and the product of the torque arm and force employed give the applied torque. From these values, the torsional modulus of elasticity of the torsion element may be determined by employing the formula $$G = \frac{TL}{\phi J}$$

where $\phi$ is the angle of twist in radians, T is the torque in inch-pounds, L is the free length of wire in inches, and J is the polar moment of inertia in inches to the fourth power, G being the torsional modulus in pounds per square inch. Using the applied torque data previously obtained, then, and the physical dimensions of the torsion element (diameter and length), the torsional modulus may be readily calculated.

The torsional modulus being known, the general power equations of the apparatus may be calculated by employing the following formula $$t = \frac{d^4 G}{583.6 L}$$

wherein $d$ is the diameter of the torsion element in inches, L the length thereof in inches, and $t$ is the torque per degree of twist in inch-pounds. It will be recognized that the method described for mounting the torsion element in the brass tubes 28 is well adapted to simplify and render exact this calculation, the soldered joints effecting a free length between the tubes readily measured and utilized as the true operative length of the wire.

The angle of torsional deflection $\theta$ may be expressed by the formula $$\theta = \frac{583.6 TL}{d^4 G}$$

$\theta$ being the angular deflection in degrees.

Horsepower may be expressed by the formula $$\text{H. P.} = \frac{TN}{63,000} = \frac{T 2\pi N}{60 \times 550 \times 12}$$

wherein N is the R. P. M. of the motor. Since $$T = t\theta = \frac{\theta d^4 G}{583.6 L}$$

horsepower may be determined in terms of $N\theta$, that is, in terms of motor R. P. M. and total torsional deflection. By correlating the diameters of the motor pulley and spindle whorl, it follows that horsepower may be expressed in terms of torsional deflection, spindle R. P. M. and whorl diameter.

Converting the horsepower to watts, a relationship involving spindle speed and spindle whorl diameter may be derived, whereby the torsional deflection effected in any case may be converted directly into power output (in watts) by the driving motor. The power formulae may be derived for all standard whorl diameters, whereby the effect on power consumption of this factor becomes immediately apparent.

The power output of the driving motor corresponds to power input into the test spindle, plus power losses due to motor pulley windage, belt and idler pulley friction. The power losses due to motor pulley windage, belt and idler pulley friction may be determined, in order to isolate by difference the power input into the spindle, by utilizing the belt to drive the idler pulley by means of the motor, and noting the power output of the motor to overcome these loss factors. This may be done at a variety of motor speeds, and the loss at each speed, in terms of degrees torsional deflection, thereby determined. It is found that differences in belt load (attained by variably tensioning the idler pulley) have very little effect on these loss values, and may be disregarded for most practical purposes. In further tests, the appropriate loss value so obtained may be subtracted from the total torsional deflection effected in the test, the difference representing the torsional deflection (and consequently power) corresponding to power input into the test spindle.

It will be evident that with the foregoing data established, numerous series of tests may be run to compare the characteristics of various types of spindles from many viewpoints, and to ascertain the effect of individual factors on spindle power consumption. For example, the effect of belt loading on spindle power consumption may be readily ascertained by testing a spindle under constant conditions of R. P. M., bobbin size and weight, oil temperature, and so forth, and varying the belt tension over a desired range, observing from the torsional deflection of the wire the resultant effect on power consumption. Similar series of tests may be repeated with spindles of other types, and the various types compared and rated with regard to variability in power consumption due to variations in belt loading.

Similarly, the effect of spindle oil viscosity on various spindles may be studied, merely by repeating a series of tests in which the only variable is the viscosity of the spindle oil. In like manner the effect of spindle oil temperature in various spindles may be ascertained.

Power curves for various spindles over a range of spindle speeds may be determined, and have been found to be particularly valuable in evaluating and rating spindles of different construction. Such curves, it will be apparent, may be ascertained by testing spindles in a series of tests wherein all conditions are maintained constant except spindle speed. Such series of tests may be repeated with standard bobbins, empty bobbins and full bobbins, in order to obtain further curves corresponding to these bobbin loadings. By running similar test series on various spindles, the power consumption of the spindles may be accurately ascertained in a form readily compared and evaluated.

The power consumption due to the weight and windage of a yarn package may be obtained by merely subtracting power consumption obtained using an empty bobbin from the value obtained using a full bobbin. To determine the power consumption due solely to the weight of a package, bobbins having identical outside dimensions and surface roughness, but varying in weight by an amount corresponding to the weight of a full package, may be employed in comparative tests. It will be evident that the effect of other factors, conditions and combinations thereof may be exhaustively studied.

The apparatus of the present invention is not only extremely versatile in scope, as indicated above, but is also accurate to a high degree. By the vertical mounting of the torsion element, rigidly supported at its upper end, and by the coaxial suspension of the driving motor from the lower end thereof, the mechanism is substantially freed of friction error, the motor being restrained from free rotation only by the resistance of the torsion element to torsional stress, except for the negligible friction of the anti-friction bearings operative to prevent lateral deviation. Thus, even small power values may be determined on the device with extremely high accuracy.

Spindle data obtained by the invention may be readily combined and correlated with data obtained by actual mill operation, whereby each may be checked against the other and a complete picture obtained.

The mechanism of the invention, if desired, may be readily applied to a working spindle on the spinning frame. Further, the mechanism is obviously adaptable to measure the power consumption of other rotatable members with comparable accuracy.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. Means for measuring power input into a rotatable member, comprising a vertically disposed torsion element, driving means depending from and supported by said torsion element, a driving connection between said driving means and said rotatable member, and means for indicating the torsional deflection of said torsion element.

2. Means for measuring power input into a rotatable member, comprising a vertically disposed torsion element, rotary driving means depending coaxially from and supported by said torsion element, a driving connection between said driving means and said rotatable member, and means for indicating the torsional deflection of said torsion element.

3. Means for measuring power input into a rotatable member, comprising a vertically disposed torsion element, said torsion element being fixedly mounted at its upper end, driving means disposed on the axis of said torsion element depending therefrom and supported thereby, means for varying the rotational speed of said driving means, a driving connection between said driving means and said rotatable member, and means for indicating the torsional deflection of said torsion element.

4. Means for measuring power input into a rotatable member, comprising a vertically disposed torsion element, rotary driving means depending coaxially from and supported by said torsion element, means for maintaining axial alignment of said driving means, a driving connection between said driving means and said rotatable member, and means for indicating the torsional deflection of said torsion element.

5. Means for measuring power input into a rotatable member, comprising a vertically disposed torsion element, rotary driving means disposed on the axis of said torsion element depending therefrom and supported thereby, means for maintaining axial alignment of said driving means, a belt driving connection between said driving means and said rotatable member, means for adjustably tensioning said driving connection, and means for indicating the torsional deflection of said torsion element.

6. Means for measuring power input into a rotatable member, comprising a vertically disposed torsion element, rotary driving means depending coaxially from and supported by said torsion element, a driving connection between said driving means and said rotatable member, means for indicating the torsional deflection of said torsion element, and means for accurately determining the rotational speed of said rotatable member.

7. Means for measuring power input into a spinning spindle, comprising a vertically disposed wire fixedly mounted at its upper end, a motor depending coaxially from and supported by said wire, a belt engaging said motor and said spindle in driving relationship, and means for indicating the torsional deflection of said wire.

8. Means for measuring power input into a spinning spindle, comprising a vertically disposed wire fixedly mounted at its upper end, a motor depending coaxially from and supported by said wire, means for maintaining axial alignment of said motor, means for varying the rotational speed of said motor, a belt engaging said motor and said spindle in driving relationship, means for indicating the torsional deflection of said torsion element, and means for accurately determining the rotational speed of said spindle.

9. Means for measuring power input into a spinning spindle, comprising a vertically disposed torsion element, said torsion element being fixedly mounted at its upper end, a motor depending coaxially from and supported by said torsion element, means for maintaining axial alignment of said motor, a belt engaging said motor and said spindle in driving relationship, an idler pulley operative on said belt to tension the belt and apply static load to said spindle, dead weight means operative to maintain the pressure of said idler pulley on said belt, and means for indicating the torsional deflection of said torsion element.

10. Means for measuring power input into a spinning spindle, comprising a vertically disposed wire fixedly mounted at its upper end, a motor depending coaxially from and supported by said wire, means for maintaining axial alignment of said motor, means for varying the rotational speed of said motor, a belt engaging said motor and said spindle in driving relationship, an idler pulley operative on said belt to tension the belt and apply static load to said spindle, dead weight means operative to maintain the pressure of said idler pulley on said belt, means for indicating the torsional deflection of said torsion element, and means for accurately determining the rotational speed of said spindle.

EDGAR H. GRANBERRY.

REFERENCES CITED

The following references are of record in the file of this patent:

UNITED STATES PATENTS

| Number | Name | Date |
|---|---|---|
| 1,192,861 | Carmichael et al. | Aug. 1, 1916 |
| 1,961,178 | Thomas | June 5, 1934 |
| 2,154,631 | McNally | Apr. 18, 1939 |
| 2,354,923 | McNamee | Aug. 1, 1944 |
| 2,511,178 | Roters | June 13, 1950 |